(12) United States Patent
Chen (10) Patent No.: US 10,065,247 B2
(45) Date of Patent: Sep. 4, 2018

(54) CUTTER FASTENING ASSEMBLY AND CUTTER HOLDER FOR THE SAME

(71) Applicant: Chin-Chiu Chen, Taichung (TW)

(72) Inventor: Chin-Chiu Chen, Taichung (TW)

(*) Notice: Subject to any disclaimer, the term of this patent is extended or adjusted under 35 U.S.C. 154(b) by 353 days.

(21) Appl. No.: 15/002,722

(22) Filed: Jan. 21, 2016

(65) Prior Publication Data

US 2017/0209937 A1 Jul. 27, 2017

(51) Int. Cl.
| B23B 29/00 | (2006.01) |
| B23B 29/04 | (2006.01) |
| B23B 31/11 | (2006.01) |

(52) U.S. Cl.
CPC .......... *B23B 29/046* (2013.01); *B23B 29/04* (2013.01); *B23B 31/1122* (2013.01); *B23B 2231/0224* (2013.01)

(58) Field of Classification Search
CPC ......... B23B 29/12; B23B 29/14; B23B 29/16; B23B 29/20; B23B 29/00; B23B 29/03; B23B 29/04; B23B 27/007; B23B 31/005; B23B 31/006; B23B 31/1122; B23B 2270/20; B23B 2270/12; B23B 2270/14; B23B 2270/16; B23B 29/046
See application file for complete search history.

(56) References Cited

U.S. PATENT DOCUMENTS

| | | | | | |
|---|---|---|---|---|---|
| 3,690,783 | A | * | 9/1972 | Heaton | B23B 29/04 408/146 |
| 3,859,699 | A | * | 1/1975 | Lindskog | B23B 29/022 407/109 |
| 6,464,433 | B1 | * | 10/2002 | Shaffer | B23B 29/022 407/118 |
| 2002/0141834 | A1 | * | 10/2002 | Kress | B23B 27/007 407/66 |
| 2010/0257982 | A1 | * | 10/2010 | Bronnimann | B23B 29/046 82/158 |
| 2010/0296889 | A1 | * | 11/2010 | Lundblad | B23C 5/003 409/131 |
| 2012/0235367 | A1 | * | 9/2012 | Chen | B23B 27/007 279/46.1 |
| 2013/0259584 | A1 | * | 10/2013 | Yang | B23B 27/002 407/11 |
| 2014/0377019 | A1 | * | 12/2014 | Kobayashi | B23B 27/007 407/11 |

* cited by examiner

*Primary Examiner* — Will Fridie, Jr.
(74) *Attorney, Agent, or Firm* — Harness, Dickey & Pierce, P.L.C.; Anthony G. Fussner (57) ABSTRACT

A cutter fastening assembly has a tool block, a fastening bolt, a fastening unit, a collet, and a cutter holder. The fastening bolt, the fastening unit, and the collet are mounted inside the tool block. The cutter holder has an assembling seat and a threaded hole. The assembling seat is integrally formed on the cutter holder and has a flange portion. The threaded hole is axially defined inside the flange portion and is screwed with the fastening bolt to keep the cutter holder connecting with the tool block.

8 Claims, 7 Drawing Sheets

CUTTER FASTENING ASSEMBLY AND CUTTER HOLDER FOR THE SAME

FIELD

The present invention relates to a machine tool, and more particularly to a cutter fastening assembly that can be assembled rapidly and conveniently.

BACKGROUND

This section provides background information related to the present disclosure which is not necessarily prior art.

Figure 6:
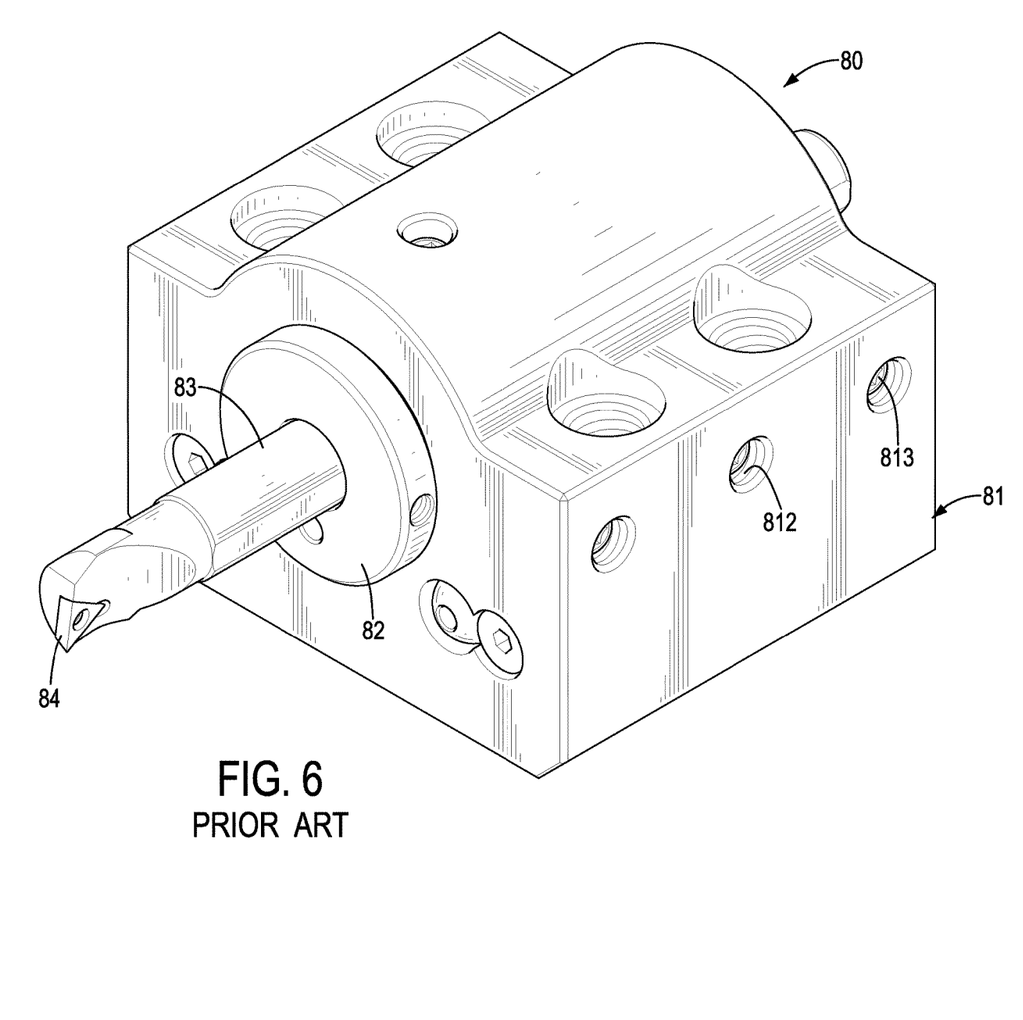
FIG. 6 is a perspective view of a conventional cutter fastening assembly.
Figure 7:
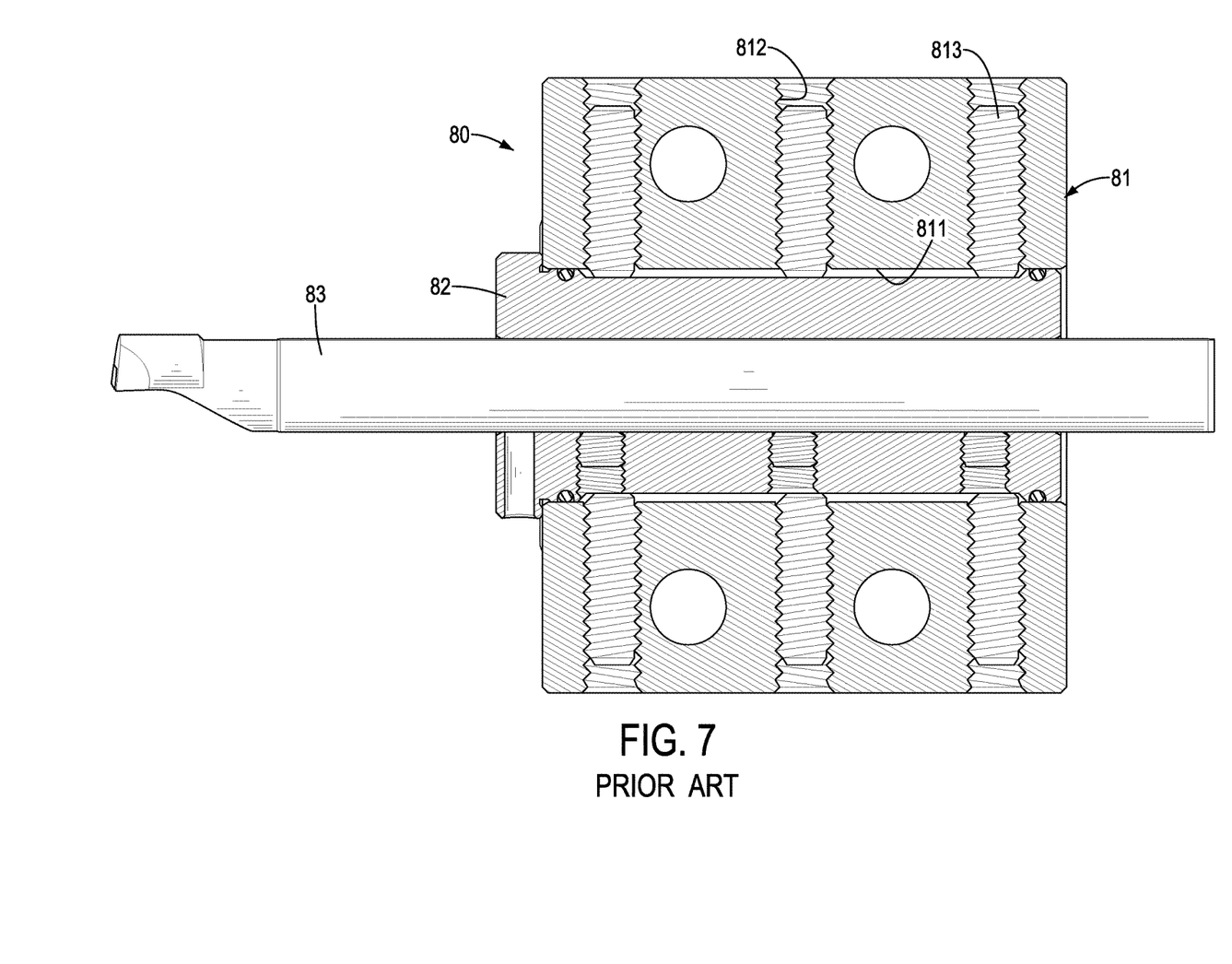
FIG. 7 is a side view in partial section of the conventional cutter fastening assembly in FIG. 6.

With reference to FIG. 6 and FIG. 7, a conventional cutter fastening assembly 80 is applied on a machining tool. The conventional cutter fastening assembly 80 has a tool block 81, a collet 82, a cutter holder 83, and a cutter 84. The collet 82 is mounted in the tool block 81. The cutter holder 83 is held in the collet 82. The cutter 84 is assembled on the cutter holder 83. The tool block 81 has a top surface, two opposite side faces, an inner socket 811, seven setting holes 812, and seven set screws 813. The inner socket 811 is longitudinally defined inside the tool block 81. One of the setting holes 812 is defined in the top surface of the tool block 81. The other setting holes 812 are divided into two sets. Each set has three setting holes 812. The two sets of setting holes 812 are respectively defined in the two side faces of the tool block 81. Each setting hole 812 communicates with the inner socket 811. The seven set screws 813 are respectively screwed in the seven setting holes 812 and respectively abut against the collet 82 to clamp the cutter holder 83 in the collet 82.

The conventional cutter fastening assembly 80 needs to lock or loosen the seven set screws 813 to change the cutter holder 83. The procedure of changing the cutter holder takes a lot of time and is inconvenient for use. Moreover, the locations and arrangement of the setting holes 812 over the surface of the tool block 81 is not aesthetic in appearance.

To overcome the shortcomings of the conventional cutter fastening assembly, the present invention provides a cutter fastening assembly to mitigate or obviate the aforementioned problems.

SUMMARY

This section provides a general summary of the disclosure, and is not a comprehensive disclosure of its full scope or all of its features.

An aspect of the present invention is to provide a cutter fastening assembly that can be assembled rapidly and conveniently.

The cutter fastening assembly includes a tool block, a fastening bolt, a fastening unit, a collet, and a cutter holder. The fastening bolt, the fastening unit, and the collet are mounted inside the tool block. The cutter holder has an assembling seat and a threaded hole. The assembling seat is integrally formed on the cutter holder and has a flange portion. The threaded hole is axially defined inside the flange portion and is screwed with the fastening bolt to keep the cutter holder connecting with the tool block.

Other aspects, advantages, and novel features of the present invention will become more apparent from the following detailed description when taken in conjunction with the accompanying drawings.

DRAWINGS

The drawings described herein are for illustrative purposes only of a selected embodiment and not all possible implementations, and are not intended to limit the scope of the present disclosure.

DETAILED DESCRIPTION

Example embodiments will now be described more fully with reference to the accompanying drawings.

Figure 1:
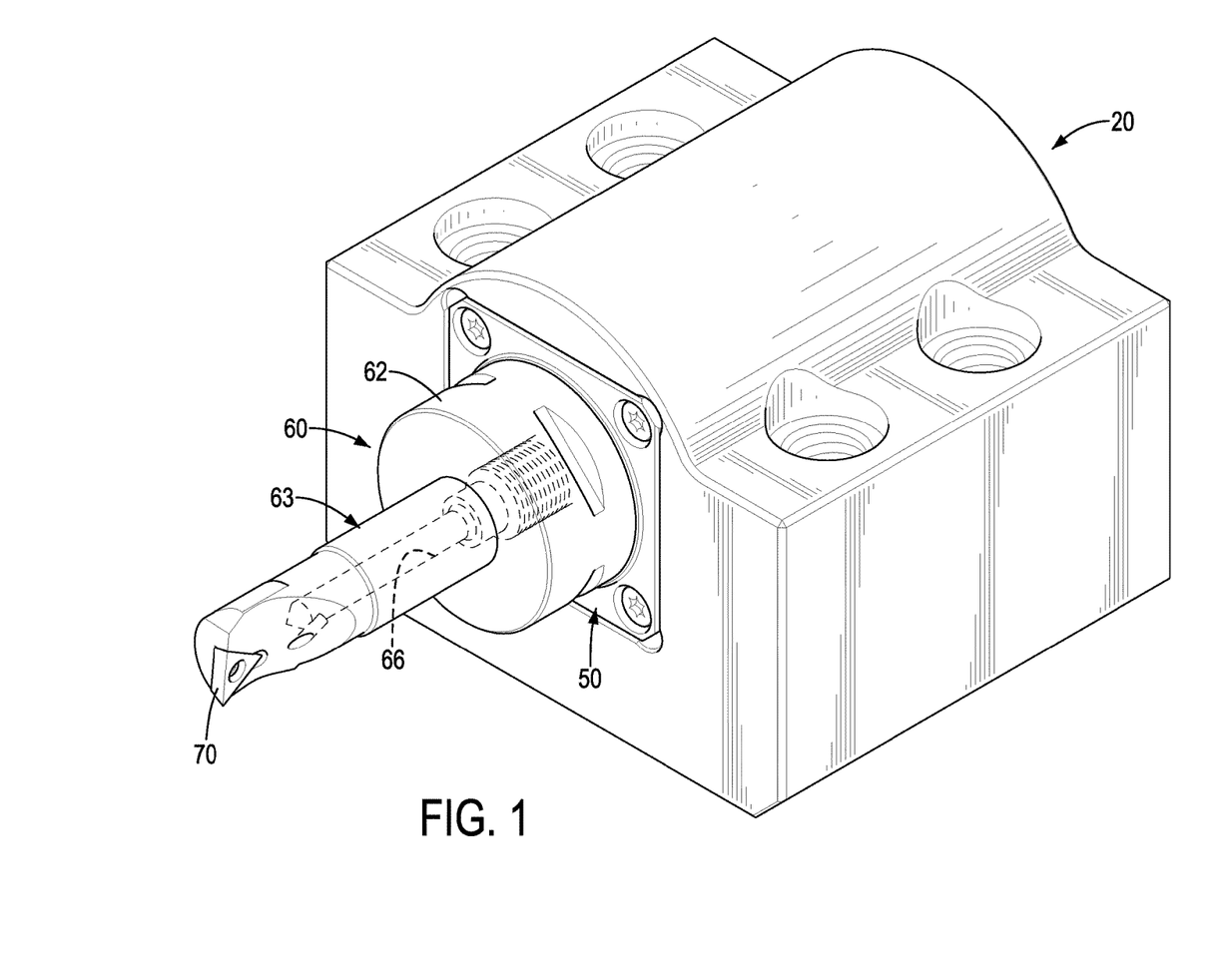
FIG. 1 is a perspective view of a cutter fastening assembly in accordance with the present invention.
Figure 2:
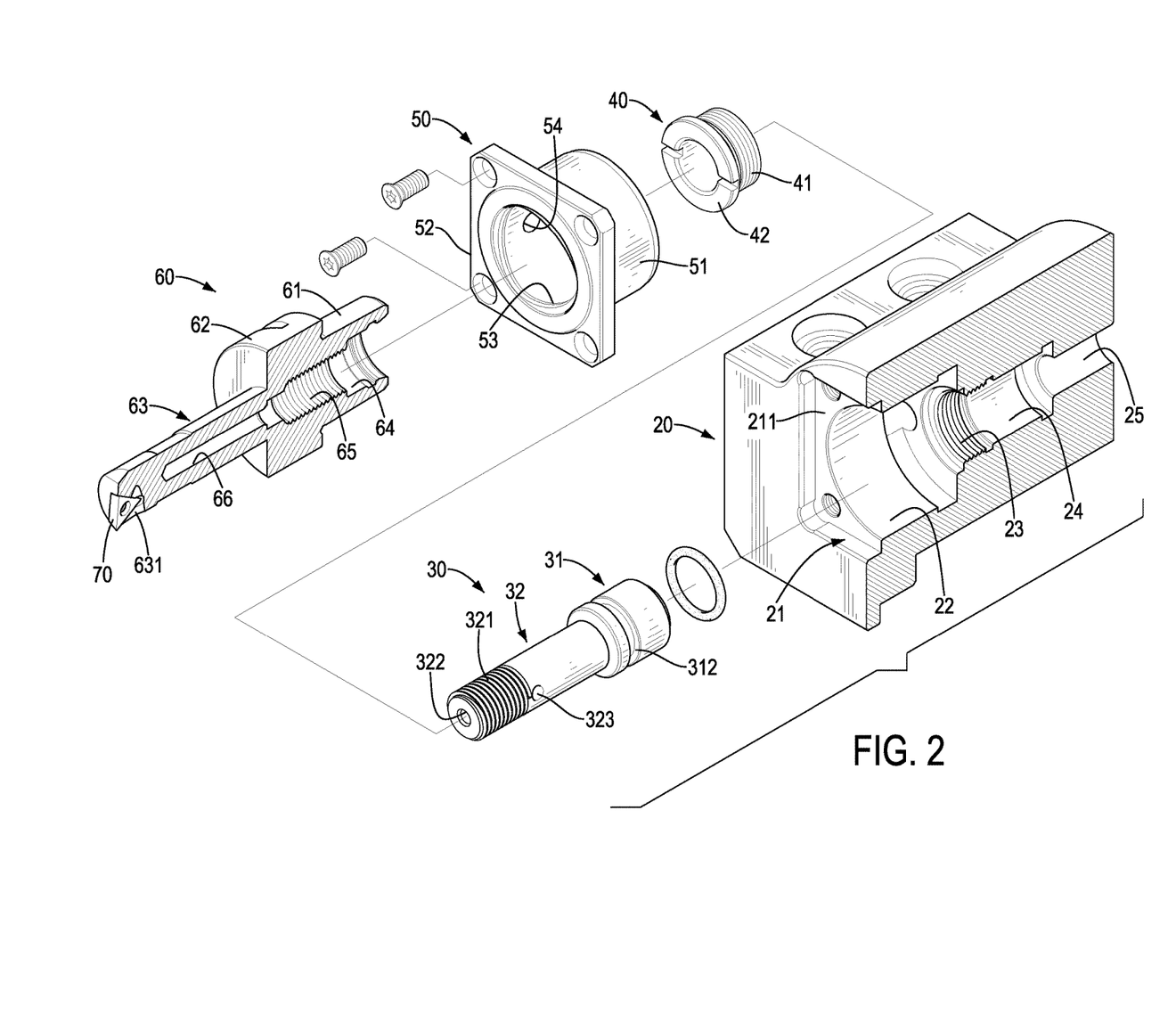
FIG. 2 is an exploded perspective view in partial section of the cutter fastening assembly in FIG. 1.
Figure 3:
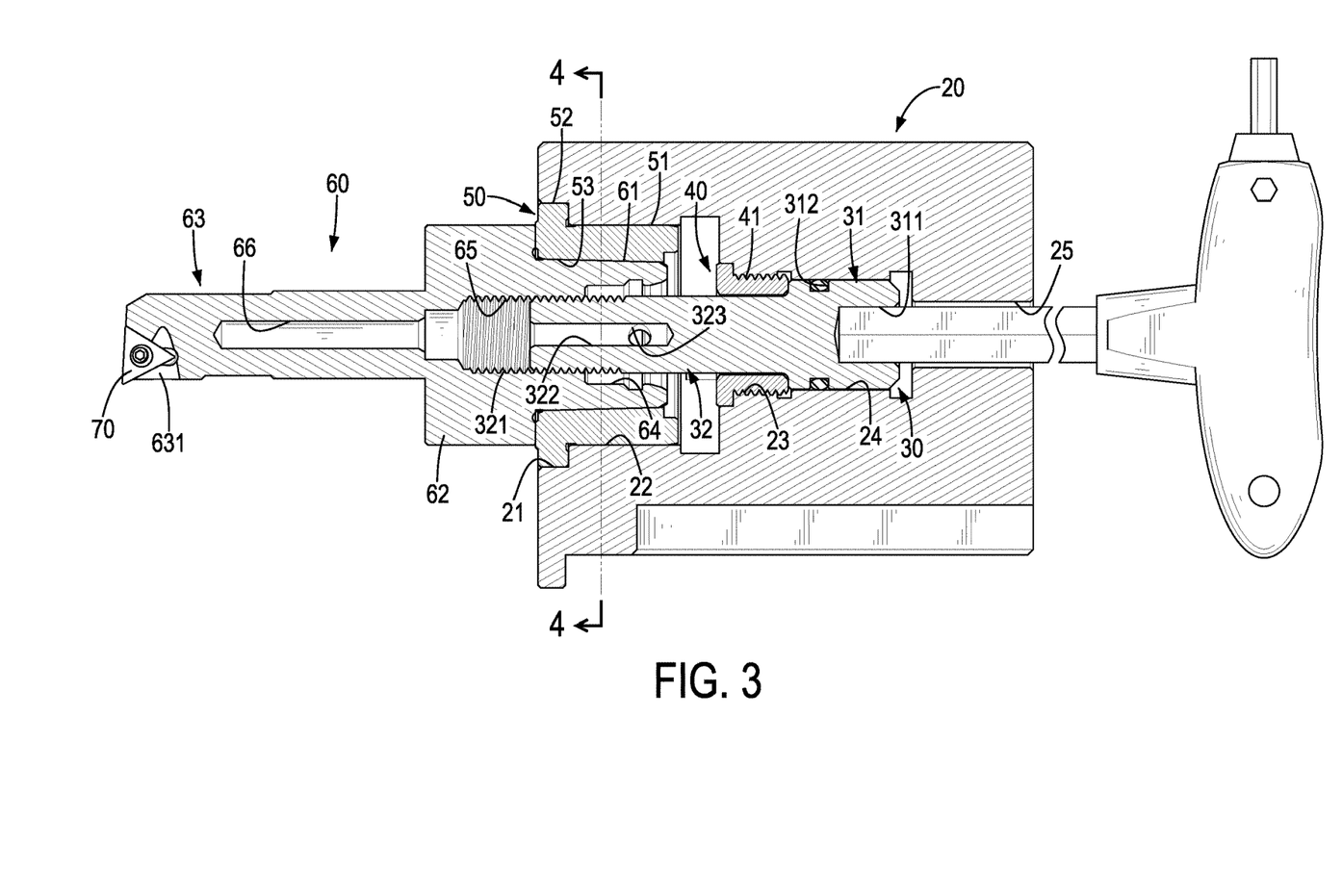
FIG. 3 is a side view in partial section of the cutter fastening assembly in FIG. 1.

With reference to FIGS. 1, 2, and 3, a cutter fastening assembly has a tool block 20, a fastening bolt 30, a fastening unit 40, a collet 50, a cutter holder 60, and a cutter 70. The fastening bolt 30, the fastening unit 40, and the collet 50 are mounted inside the tool block 20. The cutter holder 60 is partly mounted in the collet 50 and is screwed with the fastening bolt 30. The cutter 70 is assembled on the cutter holder 60.

With reference to FIGS. 1, 2, and 3, the tool block 20 has two opposite ends, a receiving recess 21, an inner socket 22, a fastening hole 23, a containing hole 24, and an adjusting hole 25. The receiving recess 21 is longitudinally defined in one of the ends of the tool block 20. The receiving recess 21 has a rectangular outline and a bottom face 211. The inner socket 22 is axially defined in the bottom face 211 of the receiving recess 21 and communicates with the receiving recess 21. The fastening hole 23 is axially defined in a bottom of the inner socket 22 and communicates with the inner socket 22. The fastening hole 23 has an inner surface and an inner thread formed on the inner surface of the fastening hole 23. The containing hole 24 is longitudinally defined in the tool block 20 and axially communicates with the fastening hole 23. The adjusting hole 25 is axially defined in a bottom of the containing hole 24 and communicates with the containing hole 24.

With reference to FIG. 2 and FIG. 3, the fastening bolt 30 is held inside the tool block 20 and has a bolt head 31 and a screwing section 32. The bolt head 31 is held in the containing hole 24 of the tool block 20 and has a diameter, two opposite ends, a peripheral surface, a recess 311, and a receiving groove 312. The recess 311 has a hexagonal outline and is axially defined in one of the ends of the bolt head 31. The receiving groove 312 is adjacent to the other end of the bolt head 31 and is annularly formed in the peripheral surface of the bolt head 31. The screwing section 32 is axially connected with the bolt head 31 and has a diameter, two opposite ends, a peripheral surface, an outer thread 321, a conducting hole 322, and a communicating hole 323. The diameter of the screwing section 32 is smaller than the diameter of the bolt head 31. The outer thread 321 is disposed at one of the ends of the screwing section 32 and away from the bolt head 31. The outer thread 321 is formed around the peripheral surface of the screwing section 32. The conducting hole 322 is axially formed in the end at which the outer thread 321 is disposed. The communicating hole 323 is adjacent to the outer thread 321 and is radially defined in the peripheral surface of the screwing section 32. The communicating hole 323 extends radially through the conducting hole 322.

With reference to FIG. 2 and FIG. 3, the fastening unit 40 is mounted in the fastening hole 23 of the tool block 20 and is mounted around the screwing section 32 of the fastening bolt 30. The fastening unit 40 abuts against the bolt head 31 of the fastening bolt 30. The fastening unit 40 has a screwing portion 41 and an abutting rim 42. The screwing portion 41 is tubular and has two opposite ends, a peripheral surface, and an outer thread formed around the peripheral surface of the screwing portion 41. The abutting rim 42 is annular and is axially connected with one of the ends of the screwing portion 41.

Figure 4:
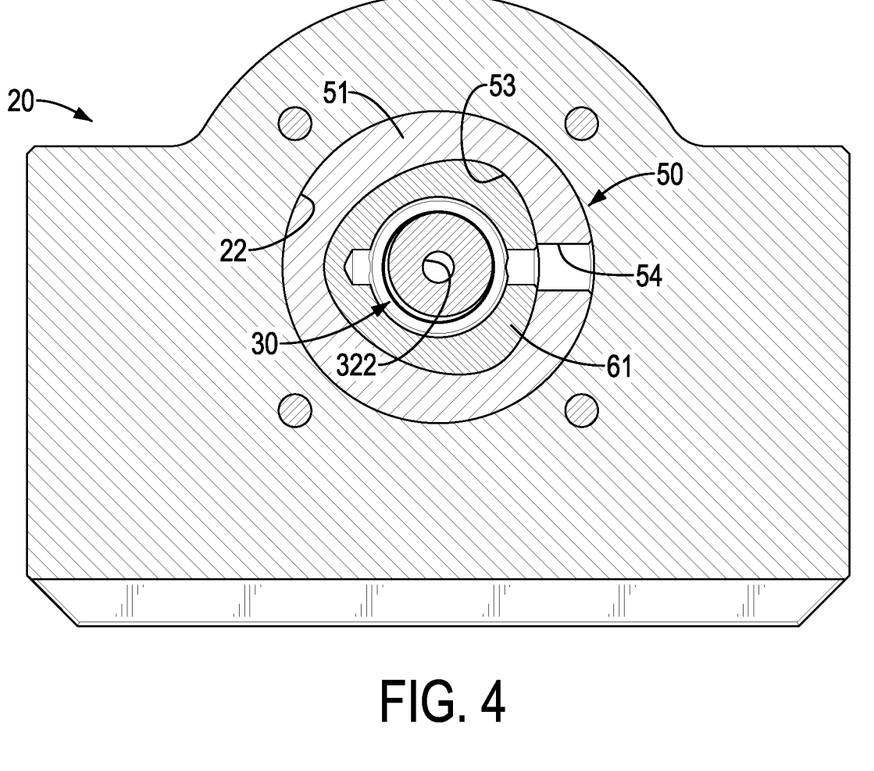
FIG. 4 is a cross sectional end view of the cutter fastening assembly along the line 4-4 in FIG. 3.

With reference to FIG. 2 and FIG. 3, the collet 50 is mounted inside the tool block 20 and has a main body 51, an abutting portion 52, a center hole 53, and a side hole 54. The main body 51 is mounted in the inner socket 22 of the tool block 20. The main body 51 has two opposite ends and a peripheral surface. The abutting portion 52 is axially connected with the main body 51 and is mounted in the receiving recess 21 of the tool block 20. The abutting portion 52 has a rectangular cross section corresponding to the outline of the receiving recess 21. The center hole 53 has a triangular outline as shown in FIG. 4. The center hole 53 is axially defined through the main body 51 and the abutting portion 52. The side hole 54 is radially formed in the peripheral surface of the main body 51 and communicates with the center hole 53.

With reference to FIGS. 1, 2, and 3, the cutter holder 60 is held by the tool block 20 and has an assembling seat which has a fastening section 61 and a flange portion 62, a cutting pole 63, a receiving hole 64, a threaded hole 65, and a channel 66. The fastening section 61 has two opposite ends and a triangular cross section corresponding to the outline of the center hole 53 of the collet 50 as shown in FIG. 4. The flange portion 62 is axially connected with one of the ends of the fastening section 61. The cutting pole 63 is axially connected with the flange portion 62 and has two opposite ends and an assembling portion 631. The assembling portion 631 is disposed at one of the ends of the cutting pole 63 and away from the flange portion 62. The receiving hole 64 is axially defined in the end of the fastening section 61 that is opposite the flange portion 62. The threaded hole 65 is axially defined in the flange portion 62 and communicates with the receiving hole 64. The threaded hole 65 has an inner surface and an inner thread formed on the inner surface of the threaded hole 65. The channel 66 is axially defined in the cutting pole 63, communicates with the threaded hole 65, and extends through an outer surface of the cutting pole 63 at a position that is adjacent to the assembling portion 631.

Figure 5:
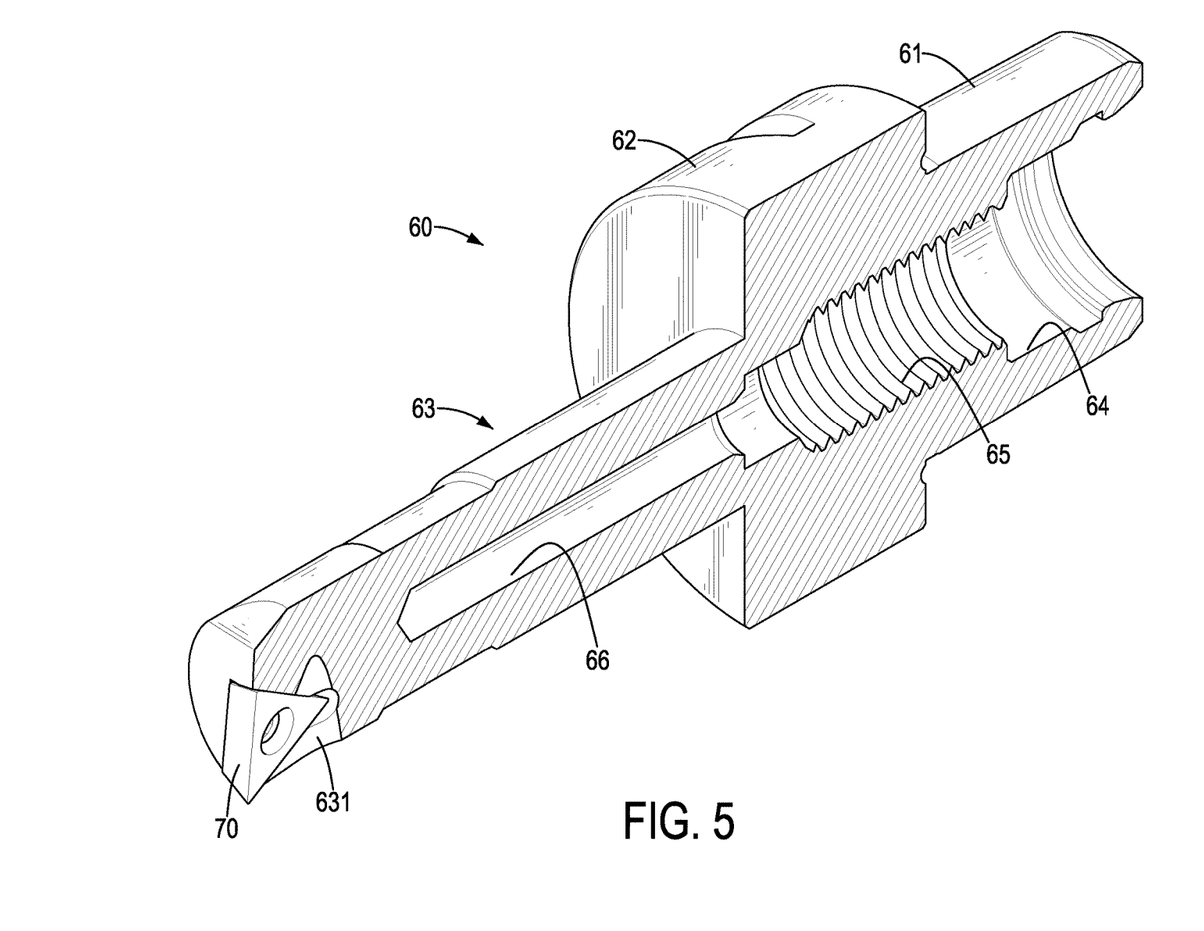
FIG. 5 is an enlarged perspective view in partial section of a cutter holder of the cutter fastening assembly in FIG. 1.

With reference to FIGS. 2, 3, and 5, the cutter 70 is mounted on the assembling portion 631 of the cutting pole 63.

With reference to FIG. 3, a hex key is inserted through the adjusting hole 25 of the tool block 20 and is inserted in the recess 311 of the fastening bolt 30 to rotate the fastening bolt 30. The fastening bolt 30 is blocked by the fastening unit 40 and spins at a fixed position. Turning the hex key in one direction can screw the fastening bolt 30 with the cutter holder 60, pull the cutter holder 60 and make the cutter holder 60 abut against the abutting portion 52 of the collet 50. Turning the hex key reversely can loosen the fastening bolt 30 and make the cutter holder 60 detach from the collet 50.

Turning the fastening bolt 30 held inside the tool block 20 can fix or loosen the cutter holder 60 and then mount or dismount the cutter holder 60 rapidly and conveniently. In addition, the tool block 20 free of multiple setting holes is aesthetic and neat in appearance.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "includes," "including," "having," "has", and "have," are inclusive and therefore specify the presence of stated features, elements, and/or components, but do not preclude the presence or addition of one or more other features, elements, components, and/or groups thereof.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A cutter fastening assembly comprising:
    a tool block;
    a fastening bolt mounted inside the tool block;
    a fastening unit mounted inside the tool block;
    a collet mounted inside the tool block; and
    a cutter holder held in the tool block and including:
        an assembling seat having a fastening section having two opposite ends and a flange portion axially connected with one of the ends of the fastening section;
        a cutting pole axially connected with the flange portion;
        a receiving hole axially defined in the other end of the fastening section opposite the flange portion; and
        a threaded hole axially defined in the flange portion and communicating with the receiving hole.

2. The cutter fastening assembly as claimed in claim 1, wherein the fastening section of the assembling seat of the cutter holder has a triangular cross section.

3. The cutter fastening assembly as claimed in claim 2, wherein the cutting pole of the cutter holder includes:
    two opposite ends;
    an assembling portion disposed at one of the ends of the cutting pole and away from the flange portion; and
    a channel axially defined in the cutting pole, the channel communicating with the threaded hole and extending through an outer surface of the cutting pole at a position that is adjacent to the assembling portion.

4. The cutter fastening assembly as claimed in claim 3, wherein the tool block includes:
    two opposite ends;
    a receiving recess longitudinally defined in one of the ends of the tool block and having a rectangular outline and a bottom face;
    an inner socket axially defined in the bottom face of the receiving recess and communicating with the receiving recess;
    a fastening hole axially defined in a bottom of the inner socket and communicating with the inner socket;

a containing hole longitudinally defined in the tool block and axially communicating with the fastening hole; and an adjusting hole axially defined in a bottom of the containing hole and communicating with the containing hole.

5. The cutter fastening assembly as claimed in claim 4, wherein the fastening bolt is held inside the tool block and includes a screwing section; and wherein the screwing section includes:

two opposite ends;

a peripheral surface;

an outer thread disposed at one of the ends of the screwing section and formed around the peripheral surface of the screwing section;

a conducting hole axially formed in the end of the screwing section at which the outer thread is disposed; and     a communicating hole being adjacent to the outer thread, radially defined in the peripheral surface of the screwing section, and communicating with the conducting hole.

6. The cutter fastening assembly as claimed in claim 5, wherein the fastening bolt includes a bolt head held in the containing hole of the tool block, axially connected with the screwing section, being away from the outer thread of the screwing section; and wherein the bolt head includes:

a diameter larger than a diameter of the screwing section;

two opposite ends;

a peripheral surface;

a recess axially defined in one of the ends of the bolt head, being away from the screwing section, and having a hexagonal outline; and     a receiving groove annularly formed in the peripheral surface of the bolt head and adjacent to the screwing section.

7. The cutter fastening assembly as claimed in claim 6, wherein the fastening unit is screwed in the fastening hole of the tool block and abuts against the bolt head of the fastening bolt; and wherein the fastening unit includes:

a screwing portion being tubular and having two opposite ends, a peripheral surface, and an outer thread formed around the peripheral surface of the screwing portion; and     an abutting rim being annular and axially connected with one of the ends of the screwing portion.

8. The cutter fastening assembly as claimed in claim 7, wherein the collet includes:

a main body mounted in the inner socket of the tool block, the main body having two opposite ends and a peripheral surface;

an abutting portion mounted in the receiving recess of the tool block, the abutting portion having a rectangular cross section corresponding to the outline of the receiving recess;

a center hole axially defined through the main body and the abutting portion, the center hole having a triangular outline corresponding to the cross section of the fastening section of the cutter holder; and     a side hole radially formed in the peripheral surface of the main body and communicating with the center hole.

\* \* \* \* \*